W. F. WIDMER.
RAIL JOINT.
APPLICATION FILED JULY 3, 1914.
1,140,644.
Patented May 25, 1915.
Fig. 1.
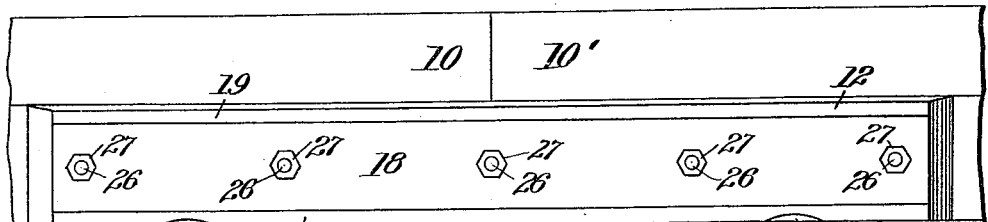
Fig. 2.
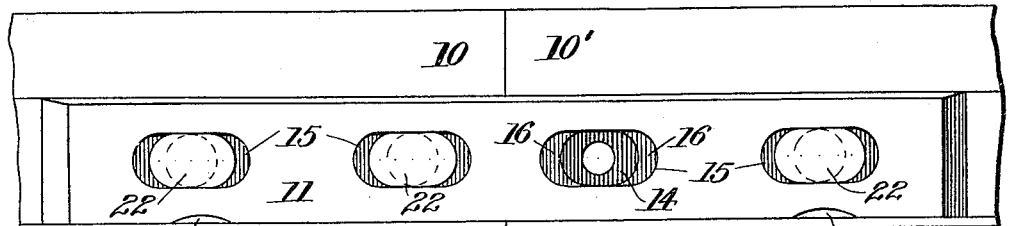
Fig. 4.
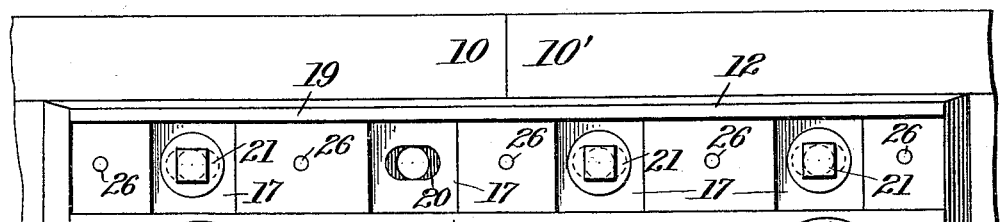
Fig. 3.
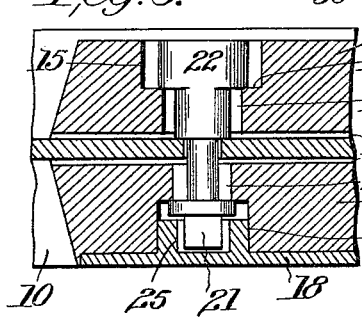
Fig. 5.
Fig. 6.
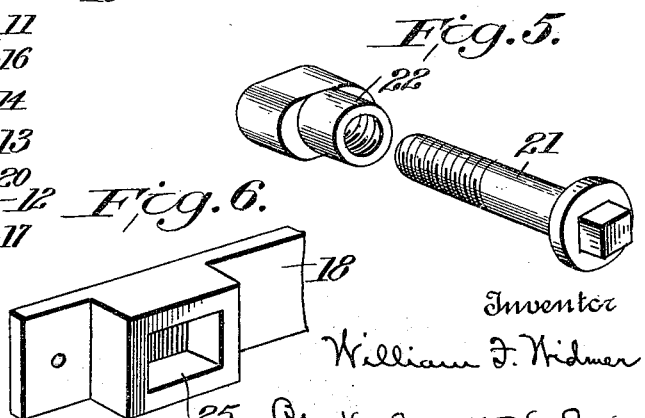
Inventor
William F. Widmer
By Hodges & Hodges
Attorneys
Witnesses
C. H. Walker
M. E. Smith

UNITED STATES PATENT OFFICE.

WILLIAM F. WIDMER, OF BRACKENRIDGE, PENNSYLVANIA.

RAIL-JOINT.

1,140,644.  Specification of Letters Patent.  Patented May 25, 1915.

Application filed July 3, 1914. Serial No. 848,810.

*To all whom it may concern:*

Be it known that I, WILLIAM F. WIDMER, a citizen of the United States, residing at Brackenridge, in the county of Allegheny and State of Pennsylvania, have invented new and useful Improvements in Rail-Joints, of which the following is a specification.

This invention has for its object the production of a rail joint which will be simple in construction, and by means of which the meeting ends of railway rails, and the like, may be securely united.

A further object of the invention is to provide improved means which may be substituted for the rail joints now in general use, whereby separation of the rails is prevented, and which may be readily applied to the rails, or removed therefrom, as occasion may require.

A further object is to produce a rail joint in which the securing bolts are entirely concealed and protected from atmospheric influences, so that corroding of the parts is in a great measure obviated.

A further object is to provide improved means for preventing loosening of the nuts and bolts after once placed in position, and yet permit of their ready separation and removal when occasion requires, without destroying any of the parts.

The invention will be hereinafter fully set forth and particularly pointed out in the claims.

In the accompanying drawing:—Figure 1 is a side view illustrating my improved rail joint. Fig. 2 is a similar view from the opposite side. Fig. 3 is a horizontal sectional view. Fig. 4 is a view similar to Fig. 1 with the cover plate removed. Fig. 5 is a detail perspective view of the bolt and nut. Fig. 6 is a detail view of a portion of the cover plate.

Referring to the drawing, 10, 10' represents the ends of the meeting rails to be united, said rails being provided with the usual bolt openings in their webs. Two fish plates 11 and 12, respectively are employed, the top and bottom edges of the fish plates being inclined to fit between the tread and the flange of the rail, longitudinal bearing ribs 13 being provided on the inner face of each fish plate, to bear against the web of the rail. The fish plate 11 is provided with elongated openings 14 which coincide with correspondingly shaped recesses 15 in the outer face of the plate, said recesses being larger than the openings 14 so as to provide shoulders 16. The fish plate 12 is provided with a series of chambers 17, corresponding in number to the recesses 15, said chambers being closed by a cover plate 18 which fits between flanges 19 formed in the outer face of the fish plate. The rear wall of the fish plate 12 is provided with openings 20 coinciding with the openings 14 in the fish plate 11.

The fish plates and the rails are united by means of bolts 21 and nuts 22, said bolts being provided with heads having flanges which bear against the inner walls of the chambers 17. The nuts are of cap-like form provided with elongated heads each having a sleeve like extension which is internally threaded to engage the threaded portion of the bolt. The heads of the nuts are provided with recesses in alinement with the bores of said sleeves, said recesses being threaded in continuation of the threads of the sleeves. The threaded recesses do not extend entirely through the nuts, an end wall being provided to protect the end of the bolt. In assembling the parts, the nuts 22 are inserted through the fish plate 11, the sleeve-like extensions projecting into the openings 14, the elongated heads entering the recesses 15 and bearing against the shoulders 16. The bolts are introduced through the chambers 17 of the fish plate 12, being passed through the openings 20 in said fish plate, and through the openings in the rail until they engage the threads of the nuts. By means of a proper wrench the bolts may now be rotated so as to clamp the fish plates and the rails between the heads of the bolts and the heads of the nuts. In this manner the ends of the sleeve-like portions of the nuts bring up against the web of the rail and the heads of the nuts against the shoulders 16. It will be noted that openings 14 and 20 are elongated to permit of expansion and contraction of the rails without destroying the clamping action of the fish plates and their adjuncts.

In assembling the parts the bolts are screwed as tightly as possible, and preferably brought with the squared portions of their heads in alinement with the flanges 19. The cover plate 18 is then placed in position. This cover plate is provided with a plurality of sockets 25, one for each bolt, and when the cover plate is in position these sockets fit over the heads of the bolts and prevent rotation of the latter. The cover plate may be secured in position in any suitable manner. I prefer, however, to provide threaded lugs 26 projecting from the fish plate 12, which lugs pass through suitable openings in the cover plate, and are engaged by nuts 27, which retain the cover plate in position.

From the foregoing, it will be understood that my improved rail joint may be readily substituted for any of the well known forms now in general use, without requiring any change in the rails. It will also be observed that the sleeve-like portions of the nuts fit entirely over and inclose the threaded portions of the bolts, thus protecting the latter from the atmosphere, and the heads of the bolts are correspondingly protected by the chambers 17 and cover plate 18. Furthermore, it will be noted that the nuts cannot turn in the recesses 15, and the bolts cannot turn when once engaged by the sockets of the cover plate. Thus it is impossible for the nuts and bolts to work loose under the vibrations usually encountered. When, however, it is desired to remove the fish plates, it is only necessary to first remove the cover plate 18 and expose the heads of the bolts, whereupon the latter may be readily unscrewed without difficulty and without injury to the parts. If desired the fish plates may be provided with recesses 30 to receive the heads of the spikes for the rails.

Having thus explained the nature of my invention and described an operative manner of constructing and using the same, although without attempting to set forth all of the forms in which it may be made, or all of the forms of its use, what I claim is:—

1. An improvement in rail joints comprising a fish plate having openings therein and elongated recesses coinciding with said openings, a second fish plate also provided with chambers corresponding to said recesses, bolts having heads located in and rotatable within said chambers, nuts having elongated heads located in said recesses, said nuts having threaded portions engaging said bolts, and a cover plate for said chambers.

2. An improvement in rail joints comprising a fish plate having openings therein and elongated recesses coinciding with said openings, a second fish plate also provided with openings and coinciding chambers, bolts having heads located in and rotatable within said chambers, nuts having reduced portions extending into the openings in the first mentioned fish plate and engaging said bolts, said nuts having heads located within said recesses, and a cover plate for said chambers.

3. An improvement in rail joints comprising a fish plate having openings therein said openings being enlarged to form recesses and shoulders, a second fish plate also provided with openings and coinciding chambers, headed nuts located in said recesses and provided with reduced portions extending into the coinciding openings, threaded bolts engaging said extensions and having heads located in and rotatable within said chambers, and a cover plate for said chambers.

4. An improvement in rail joints comprising two fish plates provided with bolt openings, bolts passed through said openings and having heads bearing against one of said fish plates, the other fish plate being provided with recesses, and nuts having heads fitting within said recesses and provided with extensions inclosing the threaded portions of said bolts, said nuts having closed outer walls to protect the threads of the bolt from the atmosphere.

5. An improvement in rail joints comprising two fish plates provided with bolt openings, bolts passed through said openings and having heads bearing against one of said fish plates, the other plate being provided with elongated recesses, and nuts having elongated heads located within said recesses, and provided with sleeve like extensions inclosing the threaded portions of said bolts, said nuts having closed outer walls to protect the threads of the bolt from the atmosphere.

6. An improvement in rail joints comprising two fish plates provided with bolt openings, one of said fish plates having chambers corresponding with said openings, bolts passed through said openings, nuts engaging said bolts, the other fish plate being provided with means for preventing rotation of said nuts, and a cover plate for said chambers.

7. An improvement in rail joints comprising two fish plates provided with bolt openings, one of said fish plates having chambers corresponding with said openings, bolts passed through said openings and having their heads located in said chambers, nuts engaging said bolts, the other fish plate being provided with means for preventing rotation of said nuts, and a cover plate for said chambers having sockets for engaging the heads of said bolts.

8. An improvement in rail joints comprising two fish plates provided with bolt openings, bolts passed through said openings, nuts engaging said bolts, one of said fish plates being provided with chambers to receive and permit rotation of the heads of said bolts, means carried by said fish plate for engaging the heads of said bolts to prevent rotation thereof, and means carried by the other fish plate for preventing rotation of the nuts.

9. An improvement in rail joints comprising two fish plates provided with bolt openings, bolts passed through said openings, nuts engaging said bolts, one of the fish plates being provided with chambers to receive and permit rotation of the heads of the bolts, a cover plate carried by said fish plate for covering said chambers and provided with means for engaging the bolt heads, and means carried by the other fish plate for preventing rotation of said nuts.

10. An improvement in rail joints comprising two fish plates provided with bolt openings, bolts passed through said openings, one of the fish plates being provided with chambers and the other with recesses coinciding with said openings, the heads of the bolts being located in and rotatable within said chambers, nuts having portions located in said recesses, and a cover plate for said chambers having means for engaging said bolts to prevent rotation thereof.

In testimony whereof I have hereunto set my hand in presence of two subscribing witnesses.

WILLIAM F. WIDMER.

Witnesses:
WM. S. HODGES,
CHAS. E. RIORDAN.

Copies of this patent may be obtained for five cents each, by addressing the "Commissioner of Patents, Washington, D. C."